Patented June 1, 1948

2,442,558

UNITED STATES PATENT OFFICE 2,442,558

PLASTICIZED COPOLYMERS OF COMPOUNDS CONTAINING A SINGLE $CH_2=C<$ GROUP AND DIESTERS OF ETHYLENE ALPHA BETA DICARBOXYLIC ACIDS

Gaetano F. D'Alelio, Northampton, Mass., assignor to Pro-phy-lac-tic Brush Company, Northampton, Mass., a corporation of Delaware No Drawing. Application April 5, 1944,
Serial No. 529,678

7 Claims. (Cl. 260—36)

This invention relates to copolymers formed by copolymerizing an ester of an ethylene alpha beta dicarboxylic acid, such as an ester of maleic acid, with another polymerizable monomer, containing a single

grouping. More particularly, the invention relates to compositions comprising plasticized copolymers of the above type.

I have discovered that it is possible to improve the compatibility of the polymer and the plasticizer by having similar groups present both in the polymer and in the plasticizer, and at the same time, there may be used as a plasticizing component a composition of sufficiently low volatility and of such a kind that its retention over a long period of time is assured.

It has been known heretofore that artificial masses and elastomeric rubber-like compositions may be made from copolymers of

compounds and esters of maleic acid by plasticizing such polymeric materials with organic compounds which have low volatility at elevated temperatures, but many materials which would normally be suitable as plasticizing agents because of their high boiling points and low vapor pressures are unsatisfactory as plasticizers over an extended range of temperature because of incompatibility with the polymeric mass.

In coplymers of

compounds and symmetrical diesters of maleic acid of short chain alcohols, such as dimethyl and diethyl esters, the ester chains are not sufficiently active in the copolymeric state so that when mixed with the plasticizer they will effect solution of the plasticizer satisfactorily in such copolymer masses. When the diesters of long chain alcohols containing more than two carbon atoms, such as the dipropyl, the dibutyl, or the dimethoxyethyl esters, are used in the copolymer, the rate of copolymerization is considerably decreased by the presence of these long ester chains and the molecular weight of the copolymer is reduced with a decrease in the physical properties of the copolymers. Furthermore, the copolymerization is usually incomplete and the unpolymerized diesters of these alcohols which must be removed, can be removed only with extreme difficulty, usually by solvent extraction, and with a resulting increase in the cost of the copolymer. For these reasons, I prefer in the practice of my invention to use a copolymer which includes an ester of an ethylene alpha beta dicarboxylic acid in which one ester group contains no more than two carbon atoms and the other ester group is a long chain alcohol radical containing more than two carbon atoms, such as a monovalent radical of a glycol monoether.

The ester used in the preparation of the copolymer would not be satisfactory as a plasticizing component because its molecular weight is not sufficiently high and in due time the plasticized composition will lose plasticizer and undergo a change in those physical properties that are dependent on plasticization. This same ester also would be undesirable since, because of its reactive double bonds, in that it may undergo polymerization to bodies of higher molecular weight after being mixed with the copolymer and on standing, thereby reducing its plasticizing effect and causing embrittlement of the copolymer.

One aspect of my present invention is based upon my discovery that these difficulties inherent to these ethylene alpha beta dicarboxylic acid esters as plasticizers for copolymers of the type mentioned may be readily overcome if a conjugated diene adduct of these unsaturated dicarboxylic acid esters is used, the ester used being the same or similar to that used in the preparation of the copolymer. In this manner, the fundamental geometric or skeletal structure of the ethylene alpha beta dicarboxylic acid ester residue in the copolymer is maintained in the plasticizer and the mixture of the copolymer and the plasticizer approaches a true solution of one body in another rather than a mere dispersion of the two components. Not only is this accomplished but also a plasticizer is produced which has a higher boiling point and a lower vapor pressure. Likewise, in a plasticizer produced by the condensation of a conjugated diene with the ethylene alpha beta dicarboxylic acid ester, the very active double bond of the ethylene alpha beta dicarboxylic acid is eliminated, this double bond being the one which results in polymerization. Although the resulting compound contains a double bond the compound is not polymerizable when mixed with the plasticizer because this remaining double bond is removed or separated by three carbon atoms from the activation of the carboxyl group.

The basic composition to be plasticized comprises a copolymer of at least one polymerizable monomer containing a single

grouping and at least one ester of an ethylene alpha beta dicarboxylic acid having the general formula

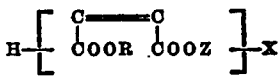

wherein X is hydrogen or halogen, R is methyl or ethyl, and Z is a monovalent radical of a glycol monoether. The plasticizer for this copolymer comprises a diester of a diene-1,3 adduct of the acid of the formula

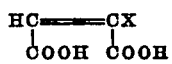

in which X is hydrogen or halogen and at least one ester group is a mono-valent radical of a glycol monoether. Preferably, the glycol monoether radical in the plasticizer is identical with the glycol monoether radical in the copolymer.

The basic concept of this invention involves (1) the preparation of a copolymer from a

compound and a second monomer, and (2) the preparation of a plasticizer therefor by reacting some of the same second monomer with a conjugated diene-1,3 to produce an adduct in which (a) the basic ester structure of the second monomer is maintained thereby preserving compatibility with the copolymer, (b) producing a material having a boiling point higher than that of the second monomer and (c) in which the skeletal structure is the same as that of the second monomer as it exists in the copolymer. The adduct of the second monomer is used as a permanent plasticizer for the copolymer.

This concept is expressed graphically using by way of illustration the following components:

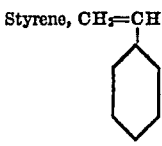

as an example of the

compound.

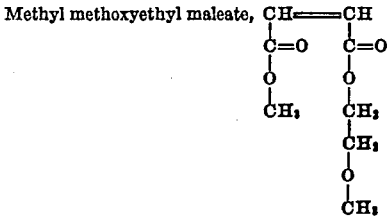

as an example of the second monomer.
This second monomer is an example of a specific ester in the class of ethylene alpha beta dicarboxylic acid esters, the same ester being used in the preparation of both the copolymer and the plasticizer for it.

The preparation of the copolymer from the styrene and the second monomer produces a copolymer with a repeating unit structure as indicated in the following equations:

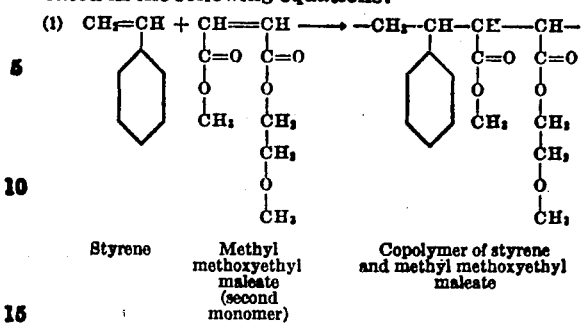

Styrene    Methyl methoxyethyl maleate (second monomer)    Copolymer of styrene and methyl methoxyethyl maleate The preparation of the plasticizer for the above copolymer from a conjugated diene, such as cyclopentadiene, and the same second monomer produces a compound according to the following reaction:

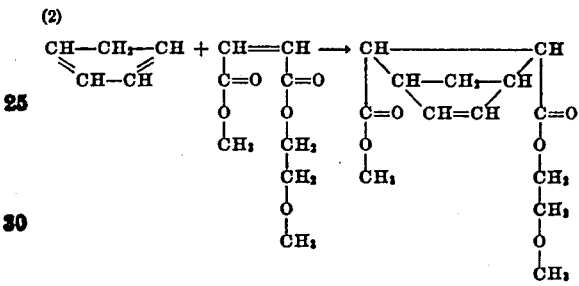

Cyclopentadiene    Methyl methoxyethyl maleate (second monomer)    Diene adduct=methyl methoxyethyl ester of endomethylene tetrahydrophthalic acid An examination of the above equations and structures of (1) and (2) illustrates the concepts of this invention disclosed heretofore. The double bond of the ethylene alpha beta dicarboxylic acid has disappeared in the course of the polymerization. It is evident that, if additional quantities of the second monomer had been used as a plasticizer for the product of Equation 1, polymerization of the second monomer would have continued and this monomer would no longer have functioned as a plasticizer.

A comparison of the diene adduct in Equation 2 with the residue of the second monomer in the copolymer shows that the basic ester structure is maintained, and that the skeletal structure of the plasticizer and the residue of the second monomer in the copolymer is identical. The vapor pressure of the diene adduct has been lowered by the attachment of the diene residue which must contain at least four carbon atoms. It is also observed that in the plasticizer the double bond between the two carboxyl groups has been eliminated. Since no double bond between two carboxyl groups is present in the adduct there is no tendency for the adduct to copolymerize with the copolymer.

The following examples illustrate how this invention is carried into effect.

*Example 1—to illustrate the preparation of what I have termed the second monomer*

Specifically, this example describes the preparation of a methyl methoxy-ethyl ester of an ethylene alpha beta dicarboxylic acid, specifically maleic acid or anhydride.

| Materials: | Parts |
|---|---|
| Benzene | 400 |
| Maleic anhydride | 98 |
| Methyl alcohol | 32 |
| Toluene sulfonic acid | 2 |

The above ingredients were mixed and refluxed for thirty minutes to produce the monomethyl ester of maleic acid as represented by the equation

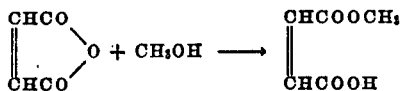

Then 83.6 parts of methyl Cellosolve (glycol monoethyl ether) were added and the reaction continued and the water of esterification removed continuously by azeotropic distillation through a Stark and Dean apparatus. When no more water of condensation was obtained, the reaction mixture was allowed to cool and was neutralized with a 5% aqueous solution of sodium carbonate. The mixture was then dried over anhydrous sodium sulfate. The benzene was removed from the mixture by distillation at atmospheric pressure and the residue distilled under vacuum. A small quantity of dimethyl maleate was obtained and discarded. An 80% to 85% yield of methyl methoxyethyl maleate was obtained as represented by the equation

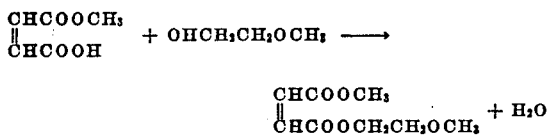

If ethyl alcohol is substituted for the methyl alcohol, the ethyl methoxyethyl ester is obtained.

*Example 2—to illustrate the preparation of a plasticizer*

Specifically this example describes the preparation of an ester of a glycol monoether of a diene adduct with an ethylene alpha beta dicarboxylic acid.

Materials:                                               Parts
  Endomethylene tetrahydrophthalic anhydride (obtained by the condensation of maleic anhydride and cyclopentadiene) _____ 154
  Benzene _____ 400
  Methyl alcohol _____ 32
  Para toluene sulfonic acid _____ 2

These components were refluxed for 30 minutes to produce the monomethyl ester of endomethylene tetrahydrophthalic acid as represented by the equation

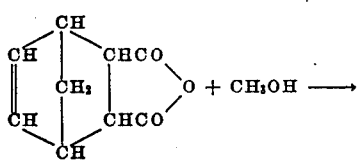

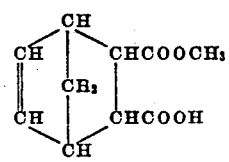

Then 83.6 parts of methyl ether of ethylene glycol (glycol monomethyl ether) were added and the reaction continued as in the procedure of Example 1 to obtain methyl methoxyethyl phthalate as represented by the equation

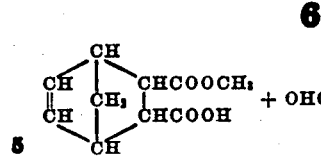

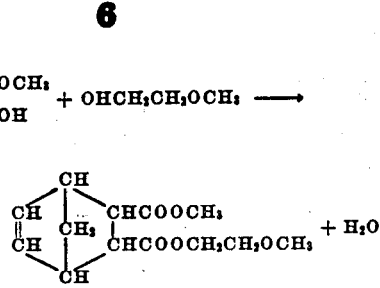

When butyl alcohol is substituted for methyl alcohol of the above example, the butyl methoxyethyl ester is obtained.

*Example 3—to illustrate the formation of copolymers to be used with the plasticizer of Example 2*

The following copolymers were prepared using the following ratios:

| $CH_2=C\diagup$ compounds | Parts of $CH_2=C\diagup$ Compounds | Parts of Methyl Methoxyethyl Maleate |
|---|---|---|
| a. Styrene | 90 | 10 |
| b. Methyl methacrylate | 90 | 10 |
| c. Ethyl methacrylate | 90 | 10 |
| d. Vinyl acetate | 90 | 10 |
| e. Acrylonitrile | 90 | 10 |
| f. Methacrylonitrile | 90 | 10 |
| g. Vinylidene chloride | 80 | 20 |
| h. Vinylidene chloride | 70 | 30 |
| i. Vinyl chloride | 80 | 20 |

To the above compositions there was added 0.1 part of benzoyl peroxide as a catalyzer and the catalyzed mixture was heated at about 55° C. until the copolymerization was complete.

Description of products:
  a. Clear hard mass
  b. Clear, hard mass
  c. Clear, hard mass
  d. Tough, clear mass
  e. Hard, white powder
  f. Clear, hard mass
  g. Tough, white powder
  h. Tough, white powder
  i. Tough, white powder.

*Example 4*

The butyl isopropyloxyethyl maleate was prepared by the method of Example 1 and also there was prepared an adduct of tung (China-wood oil) oil, in accordance with the method of Example 2.

*Example 5—to illustrate the plasticization of certain copolymers of Example 3*

Specifically this example describes the use and effect of the diene adduct to plasticize a copolymer which consists of a

compound and the specific esters used in the practice of this invention.

The styrene methyl methoxyethyl maleate copolymer of Example 3a was processed on milling rolls, and several different quantities of the cyclopentadiene-butyl methoxyethyl maleate adduct (butyl methoxyethyl ester of endomethylene tetrahydrophthalic acid) were added as plasticizers and the Shore hardness and compatibility of the resulting plasticized compositions were observed. The copolymer originally prepared had a Shore hardness in excess of 100. (The limit of the Shore hardness scale is 100.) The following table illustrates the change in Shore hardness by the addition of definite quantities of plasticizer.

| Plasticizer | Shore Hardness | Per Cent Plasticizer |
|---|---|---|
| The butyl methoxyethyl endomethylene tetrahydrophthalate | 100 | 24 |
|  | 80 | 29 |
|  | 55 | 34 |
|  | 15 | 39 |

When the value of the Shore hardness is plotted against the amount of plasticizer, a smooth curve is attained and shows compatibility over the complete range. These results are in contrast with the use of other plasticizers recommended industrially for styrene polymerizates. The same styrene copolymer was processed with several different quantities of dibenzyl sebacate with the same procedure that was used for the adduct in the previous part of this example. When 22½ parts of dibenzyl sebacate were added, incompatibility of the plasticizer and the copolymer was observed, and the Shore hardness of the greasy fragile mass was 90. It was not possible to control the hardness of the material by the addition of plasticizer since a change of only 2½% plasticizer, that is, from 22.5 to 25% plasticizer produced an abrupt change of Shore hardness from 90 to 10 together with incompatibility.

*Example 6—to illustrate the plasticization of other copolymers of Example 3*

The plasticization of the methyl methacrylate and ethyl methacrylate copolymers of Examples 3b and 3c with the butyl methoxyethyl endomethylene tetrahydrophalate was done in a manner similar to that of Example 5.

| Copolymer Plasticized | Shore Hardness | Per Cent Plasticizer |
|---|---|---|
| Methyl methacrylate | More than 100 | 0 |
|  | 100 | 5 |
|  | 77 | 10 |
|  | 55 | 17 |
|  | 32 | 20 |
| Ethyl methacrylate | More than 100 | 0 |
|  | 100 | 7 |
|  | 85 | 10 |
|  | 60 | 17 |
|  | 40 | 20 |

The plasticizing efficiency of these examples may be contrasted with the use of dibenzyl sebacate, which is a widely used plasticizer for

compounds and particularly for the methacrylate esters. With the same methyl methacrylate copolymer 17 parts of dibenzyl sebacate were required to produce a Shore hardness of 100 in contrast to my adduct where only 5 parts were required to give the same hardness and when 17 parts were used the Shore hardness was reduced to 55. When 24 parts of dibenzyl sebacate were used a Shore hardness of 70 resulted whereas the adduct gave a Shore hardness of 32 when only 20 parts of the adduct were used.

*Example 7—to illustrate the plasticization of the vinyl acetate copolymer of Example 3*

In this case the copolymer was a copolymer of vinyl acetate and methyl methoxyethyl maleate and the plasticizer was the adduct product of cyclopentadiene and the butyl methoxyethyl ester of maleic acid.

The following range of values was observed:

| Shore Hardness | Per Cent Plasticizer |
|---|---|
| 100 | 13 |
| 85 | 17 |
| 60 | 19 |
| 40 | 22 |

The dienes used for the preparation of the adduct may contain a system of conjugated double bonds which may be in a straight chain, as for example, in butadiene, isoprene, dimethyl butadiene, myrcene, etc., or in a cyclic structure, such as, in cyclopentadiene, cyclo hexadiene, etc., or in a heterocyclic system such as furane, etc. The primary requisite is that the diene used in the adduct contains at least four carbon atoms and that the unsaturation be conjugated. The basic structure of the diene is represented by the carbon system $$-\overset{|}{C}=\overset{|}{C}-\overset{|}{C}=\overset{|}{C}-$$

As examples of glycol monoethers suitable for preparing the methyl and ethyl esters of the ethylene alpha, beta dicarboxylic acid as the copolymerizing ingredient with the

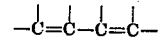

compound may be mentioned the monoalkyl and monoaryl ethers of glycols, such as the methyl, ethyl, propyl, isopropyl, butyl, isobutyl, secondary butyl, tertiary butyl, amyl, hexyl, phenyl, benzyl, chlorbenzyl, cyclohexyl, furfuryl, etc. monoethers of ethylene glycol, propylene glycol, butylene glycol, hexylene glycol, xylylene gylcol, etc.

These same glycol monoethers are used in the preparation of the adduct-plasticizer, the main requirement of which is that at least one ester group be derived from a glycol monoether. The remaining ester may be derived from the same or a different glycol monoether or may be a methyl or ethyl group corresponding to the ester group in the copolymer or may be derived from monoesterifiable hydroxy compounds such as propyl, butyl, amyl, hexyl, octyl, nonyl, decyl, cetyl, cyclohexyl, methyl cyclohexyl, benzyl, chlorbenzyl, nitrobenzyl, furfuryl, tetrahydrofurfuryl alcohols, etc. Intended also are alcohols of the type of Δ3-norbornylene-ol-1; Δ3-cyclohexyl-ol-1; 2,4-endoethylene-3-cyclohexane-ol-1; 2,5-endomethylene hexahydrobenzyl alcohol; 2,5-endomethylene-6-methyl hexahydrobenzyl alcohol.

As typical examples of

compounds used in the practice of this invention there may be mentioned the vinyl esters, such as, vinyl acetate, vinyl chloroacetate; vinyl aryl compounds, for example, styrene, isopropenyl benzene, the ortho, meta, and para mono, di, and trichlorstyrenes; the acrylic esters, for example, methyl, ethyl, propyl acrylates; the methacrylic esters, for example, methyl, ethyl, propyl acrylates; the methacrylic esters, for example, methyl methacrylate, ethyl methacrylate; the acrylonitriles, for example, acrylonitrile, methcrylonitrile; the monovinyl ethers, for example, ethyl vinyl ether, propyl vinyl ether, butyl vinyl ether, etc.; the vinylidene compounds, such as vinylidene chloride, vinylidene bromochloride; the vinyl halides e. g. vinyl bromide, the chloroacrylates, e. g. ethyl chloracrylate, etc., the itaconic esters; the methylene malonic esters; etc. It is to be observed that vinyl halides, the vinylidene halides and the chloracrylic esters are halogenated ethylene derivatives in which the

structure has been preserved.

The ethylene dicarboxylic acid esters used in the preparation of the copolymer are selected from the class of maleic, fumaric, and chlormaleic acid esters in which one ester group is selected from the class of ethyl and methyl radicals and the remaining ester group is a monovalent radical of a glycol monovalent ether.

Dyes, pigments, plasticizers, mold lubricants, opacifiers, and various fillers, for example, wood flour, powdered and fibrous glass, asbestos, including defibrated asbestos, mineral wool, mica, cloth cuttings, ground cork, ground scrap leather, lignocellulose, natural, reclaimed and synthetic rubbers, etc., may be compounded with the resins in accordance with the conventional practice.

Barium sulfate, zinc sulfide, titanium compounds, such as the oxide, flaked aluminum, etc., may be incorporated into the compositions to alter their visual appearance and the optical properties of the finished product.

The modified and unmodified resinous compositions of this invention have a wide variety of uses, for example, in addition to their use in the production of molding compositions and sheet stock, they may be used in conjunction with the natural and synthetic resins. In the intermediate varnish form they may be used, e. g., in laminating varnishes, in the production of laminated articles or in sheet materials, for example, with cloth, paper, sheet asbestos, pottery, glass, felt, cork, wood, etc. These materials may be coated and impregnated with resin superimposed and united under heat and pressure. They may be extruded in the form of wire coating or they may be used in the production of wire or baking enamels for bonding or cementing together mica flakes or for bonding together abrasive grains, in the production of resin bonded abrasive articles, such as, for instance, sandpaper, etc., and also in the manufacture of electrical resistance. They may also be used as impregnants for coils and for other electrical insulation. They also may be employed in the treating of cotton, linen, and other cellulosic materials or derivatives in sheet or other form. They also may be used in making paints, varnishes, lacquers, enamels, and other protective surface materials. They likewise may be used as water repellents and sizings when applied to wood and the like or to fibrous materials such as silk, cotton, wool, synthetic organic fibers, etc., in continuous filament, treated fabric, or other form.

The modifying bodies also may take the form of high molecular weight bodies with or without resinous characteristics, for example, partially hydrolyzed wood products; lignocellulose, lignin, proteins, protein aldehyde condensation products; furfuryl condensation products; phenol aldehyde condensation products; aniline aldehyde condensation products; modified or unmodified, saturated or unsaturated, polybasic acid-polyhydric alcohol condensation products; sulfonamide aldehyde resins; water-soluble cellulose derivatives; natural gums and resins such as copal, shellac, rosin, etc., polyvinyl alcohol compounds such as polyvinyl alcohol, polyvinyl acetate, polyvinyl acetals; etc.

I claim:

1. A composition of matter comprising (a) a copolymer of a polymerizable monomer containing a single

grouping and an ester which has the structure of an ester of an acid of the general formula

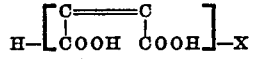

in which one carboxyl group has been reacted with a glycol monoalkyl ether and the other carboxyl group has been reacted with a compound selected from the group consisting of a methyl and ethyl alcohol, and (b) a plasticizer for the copolymer comprising an adduct of a conjugated diene hydrocarbon having the basic structure represented by the carbon system

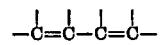

with an ester which has the structure of an acid of the formula

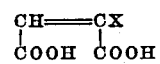

in which one carboxyl group has been reacted with a glycol monoalkyl ether, and the other carboxyl group has been reacted with an alcohol selected from the group consisting of furfuryl alcohol, benzyl alcohol, chlorbenzyl alcohol, nitrobenzyl alcohol, and a saturated monohydric alcohol, X in each of said acids being selected from the group consisting of hydrogen and a halogen.

2. A composition of matter comprising (a) a copolymer of a polymerizable monomer containing a single

grouping and a maleic acid ester having the structure of that in which one carboxyl group has been reacted with a glycol monoalkyl ether and the other carboxyl group has been reacted with methyl alcohol, and (b) a plasticizer for the copolymer comprising an adduct of a conjugated diene hydrocarbon having the basic structure represented by the carbon system

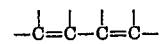

with a maleic acid ester which has the structure of that in which one carboxyl group has been reacted with a glycol monoalkyl ether, and the other carboxyl group has been reacted with a saturated monohydric alcohol.

3. A composition of matter comprising (a) a copolymer of a vinyl compound having a single vinyl radical and a maleic acid ester having the structure of that in which one carboxyl group has been reacted with a glycol monoalkyl ether and the other carboxyl group has been reacted with methyl alcohol, and (b) a plasticizer for the copolymer comprising an adduct of a conjugated diene hydrocarbon having the basic structure represented by the carbon system

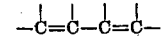

with a maleic acid ester which has the structure of that in which one carboxyl group has been reacted with a glycol monoalkyl ether, and the other carboxyl group has been reacted with a saturated monohydric alcohol.

4. A composition of matter comprising (a) a copolymer of vinyl acetate and a maleic acid ester having the structure of that in which one carboxyl group has been reacted with a glycol monoalkyl ether and the other carboxyl group has been reacted with methyl alcohol, and (b) a plasticizer for the copolymer comprising an adduct of a conjugated diene hydrocarbon having the basic structure represented by the carbon system

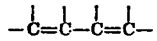

with a maleic acid ester which has the structure of that in which one carboxyl group has been reacted with a glycol monoalkyl ether, and the other carboxyl group has been reacted with a saturated monohydric alcohol.

5. A composition of matter comprising (a) a copolymer of a vinyl aryl compound having a single vinyl radical and a maleic acid ester having the structure of that in which one carboxyl group has been reacted with a glycol monoalkyl ether and the other carboxyl group has been reacted with methyl alcohol, and (b) a plasticizer for the copolymer comprising an adduct of a conjugated diene hydrocarbon having the basic structure represented by the carbon system

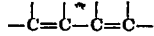

with a maleic acid ester which has the structure of that in which one carboxyl group has been reacted with a glycol monoalkyl ether, and the other carboxyl group has been reacted with a saturated monohydric alcohol.

6. A composition of matter comprising (a) a copolymer of styrene and methyl methoxyethyl maleate, and (b) a plasticizer for the copolymer comprising the adduct of cyclopentadiene and a maleic acid ester which has the structure of that in which one carboxyl group of maleic acid has been reacted with a saturated monohydroxy alcohol and the other carboxyl group has been reacted with a glycol monoalkyl ether.

7. A composition of matter comprising (a) a copolymer of vinyl acetate and methyl methoxyethyl maleate, and (b) a plasticizer for the copolymer comprising the adduct of cyclopentadiene and a maleic acid ester which has the structure of that in which one carboxyl group of maleic acid has been reacted with a saturated monohydroxy alcohol and the other carboxyl group has been reacted with a glycol monoalkyl ether.

GAETANO F. D'ALELIO.

REFERENCES CITED

The following references are of record in the file of this patent:

UNITED STATES PATENTS

| Number | Name | Date |
|---|---|---|
| 2,015,077 | Lawson | Sept. 24, 1935 |
| 2,187,817 | Hopff et al. | Jan. 23, 1940 |
| 2,301,867 | Gresham | Nov. 10, 1942 |
| 2,311,259 | Staff et al. | Feb. 10, 1943 |
| 2,311,260 | Staff et al. | Feb. 10, 1943 |
| 2,375,960 | Stoops | May 15, 1945 |
| 2,384,855 | Soday | Sept. 18, 1945 |